(12) United States Patent  (10) Patent No.: US 6,714,489 B2
Kalis et al.  (45) Date of Patent: *Mar. 30, 2004

(54) SKIP DETECTOR FOR COMPACT DISC JUKEBOX

(75) Inventors: Jeffrey J. Kalis, Grand Rapids, MI (US); Frederick G. Robinson, Holland, MI (US); Richard Van Dyk, Kentwood, MI (US)

(73) Assignee: Rowe International Corporation, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/405,591

(22) Filed: Apr. 2, 2003

(65) Prior Publication Data

US 2003/0189880 A1 Oct. 9, 2003

Related U.S. Application Data

(62) Division of application No. 09/810,760, filed on Mar. 16, 2001, now Pat. No. 6,639,876, which is a continuation of application No. 08/351,044, filed on Nov. 28, 1994, now Pat. No. 6,212,138, which is a continuation of application No. 07/383,745, filed on Jul. 20, 1989, now abandoned.

(51) Int. Cl.[7] ............................................... G11B 17/22
(52) U.S. Cl. .............................. 369/30.06; 369/30.08; 369/30.27; 369/19; 360/73.03
(58) Field of Search ................... 369/30.13, 85, 369/19, 30.06, 30.4, 30.31, 30.43, 30.27, 30.28, 30.08, 233–236, 242; 360/73.03, 72.1, 72.2, 73.01; 40/463, 475, 510

(56) References Cited

U.S. PATENT DOCUMENTS

| 2,627,415 | A |   | 2/1953 | Rasmussen |
|---|---|---|---|---|
| 3,311,378 | A |   | 3/1967 | Clark |
| 4,013,157 | A |   | 3/1977 | Britz et al. |
| 4,094,010 | A |   | 6/1978 | Pepperl et al. |
| 4,258,838 | A |   | 3/1981 | Rockola et al. |
| 4,677,602 | A |   | 6/1987 | Okano et al. |
| 4,800,549 | A |   | 1/1989 | Yamagami et al. |
| 5,031,346 | A | * | 7/1991 | Herring et al. ............... 40/463 |
| 6,212,138 | B1 |   | 4/2001 | Kalis et al. |

FOREIGN PATENT DOCUMENTS

| EP | 218572 | 4/1987 |
|---|---|---|
| EP | 313359 | 4/1989 |

* cited by examiner

Primary Examiner—Ali Neyzari
(74) Attorney, Agent, or Firm—Van Dyke, Gardner, Linn & Burkhart, LLP

(57) ABSTRACT

A control system for a compact disc jukebox detects skips in the compact disc by reading an apparent elapsed time signal from the compact disc that is encoded on the compact disc. A timer is simultaneously started and outputs a real elapsed time signal. A comparison is made between the real elapsed time signal and the apparent elapsed time signal. If the difference between these two signals exceeds a predetermined amount of time, a skip is recorded. The detection of a skip may be recorded as to a particular selection on a particular CD, along with the time of the skip. Appropriate action may be taken in response to the recording of a skip, such as cancelling the selection or stopping the CD.

6 Claims, 8 Drawing Sheets

SKIP DETECTOR FOR COMPACT DISC JUKEBOX

CROSS-REFERENCE TO RELATED APPLICATIONS

This application is a divisional of U.S. application Ser. No. 09/810,760, filed Mar. 16, 2001, U.S. Pat. No. 6,639,876, which is, in turn, a continuation of commonly-assigned application Ser. No. 08/351,044, filed Nov. 28, 1994, and now U.S. Pat. No. 6,212,138, which is, in turn, a continuation of commonly-assigned application Ser. No. 07/383,745, filed on July 20, 1989, and now abandoned.

FIELD OF THE INVENTION

The invention is the in the field of money-operated phonographs and more specifically in the field of control systems for phonographs which play compact discs.

BACKGROUND OF THE INVENTION

There have long been known in the prior art money responsive automatic phonographs commonly known as "jukeboxes." These devices of the prior art normally play selections from 45 rpm records which, in response to the deposit of money and to making of a selection by use of a keyboard or the like, extract the record carrying the desired selection from a magazine and place it with the proper side up on the player turntable.

Control systems for automatic phonographs of the type described hereinabove incorporate a number of auxiliary features. They include various accounting features which record the amount of money which has been deposited in the machine, the number of times each selection has been made and the like. By use of this information, arrangements have been provided whereby the customer may operate a particular button to play the most popular selection, for example.

In addition to the most popular selection, some jukeboxes of the prior art incorporate a feature by virtue of which a selection is automatically played after a predetermined idle period. A manually operable switch may be provided to permit the machine to be set for a period of free play during which no money need to be deposited in order to make a selection.

There have recently come into widespread use phonographs which incorporate lasers for reading music coded on a disc in digital form. While these compact discs are very rugged devices, sometimes they develop problems similar to those which may be encountered in vinyl records. Skips and dropouts are not uncommon CD faults. Sometimes the CD player may not be able to read the disc at all. Control systems of the type discussed hereinabove make no provision for cancelling a selection in the event that the record incorporates a major defect. Neither do they provide any means for recording such defects for later review to permit defective records or discs to be replaced.

SUMMARY OF THE INVENTION

One object of our invention is to provide an automatic phonograph control system which is more sophisticated than are control systems of the prior art.

Another object of our invention is to provide an automatic phonograph control system which is especially adapted for use with a CD player.

A further object of our invention is to provide an automatic phonograph control system which automatically cancels a selection after a predetermined number of skips.

Still another object of our invention is to provide an automatic phonograph control system which automatically cancels a selection after a predetermined maximum skip time has elapsed.

Still another object of our invention is to provide an automatic phonograph control system which records all skips and cancellations for later review.

A still further object of our invention is to provide an automatic phonograph control system having an autoplay feature which can be set for days of the week, hours of the day, intervals between autoplays and selected or random autoplays.

Yet another object of our invention is to provide an automatic phonograph control system which has a free play feature which can be set for the days of the week and times of the days.

An additional object of our invention is to provide an automatic phonograph control system which can be set to clear unplayed selections after a period of time following turnoff of the phonograph.

Yet another object of our invention is to provide an automatic phonograph control system which affords a most popular selection display of particular tracks of a CD disc.

BRIEF DESCRIPTION OF THE DRAWINGS

In the accompanying drawings to which reference is made in the instant specification and which are to be read in conjunction therewith and in which like reference characters are used to designate the same parts in the various views.

DESCRIPTION OF THE PREFERRED EMBODIMENTS

Figure 1:
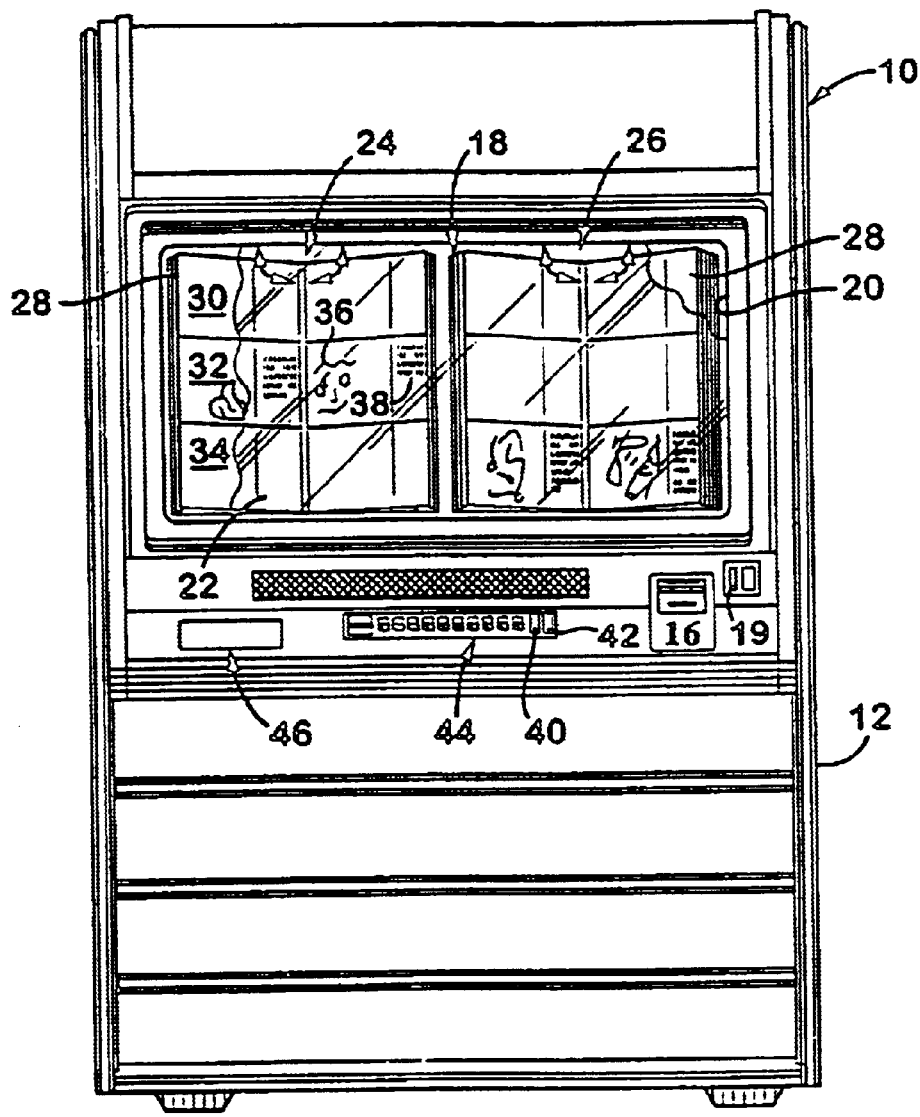
FIG. 1 is a front elevation of a CD automatic phonograph which is provided with our control system.
Figure 2:
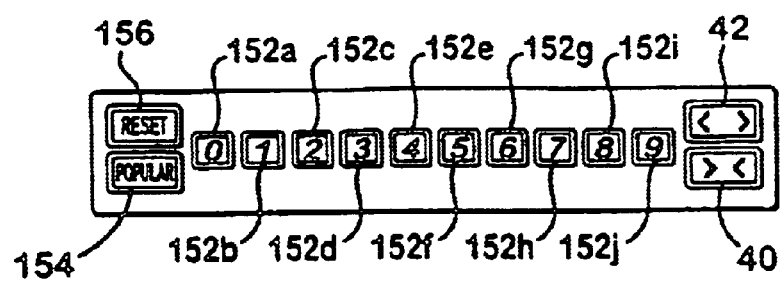
FIG. 2 is a plan view of the keyboard of the phonograph shown in FIG. 1.

Referring now to FIGS. 1 and 2, an automatic phonograph indicated generally by the reference character 10 which may be provided with our control system includes a cabinet 12, the front of which is provided with a coin slot 14 and a bill insertion slot 16.

A title page display area indicated generally by the reference character 18 located in a recess 20 in the front of the cabinet behind a window 22 receives respective page assemblies 24 and 26. Each of these page assemblies includes a plurality of panels 28. Each panel 28 except the outermost panels comprises two pages on the opposite sides thereof Each page is adapted to receive three CD jackets 30, 32, and 34, each of which includes pictorial matter 36 as well as an alphanumeric descriptive material 38. Copending application of Herring et al Ser. No. 384,733 filed Jul. 24, 1989 discloses the page turning mechanism and the portion of the automatic phonograph control system relating thereto.

The front of the cabinet 12 also receives a keyboard or pushbutton array indicated generally by the reference character 44 as well as a display area indicated generally by the reference character 46, which is adapted to show the selection playing, the selection being made, the selections remaining, as well as the service mode display which will be described more fully hereinbelow.

The pushbutton or keyboard assembly includes respective pushbuttons 40 and 42 adapted to be pushed by a potential customer to change the display by moving the pages of the sets 24 and 26 inwardly or outwardly.

The assembly 44 also includes a plurality of numerical pushbuttons 152*a* through 152*j* corresponding to the "0" and to the digits 1 to 9 respectively. A reset button 156 and a popular button 154 complete the assembly.

Figure 3:
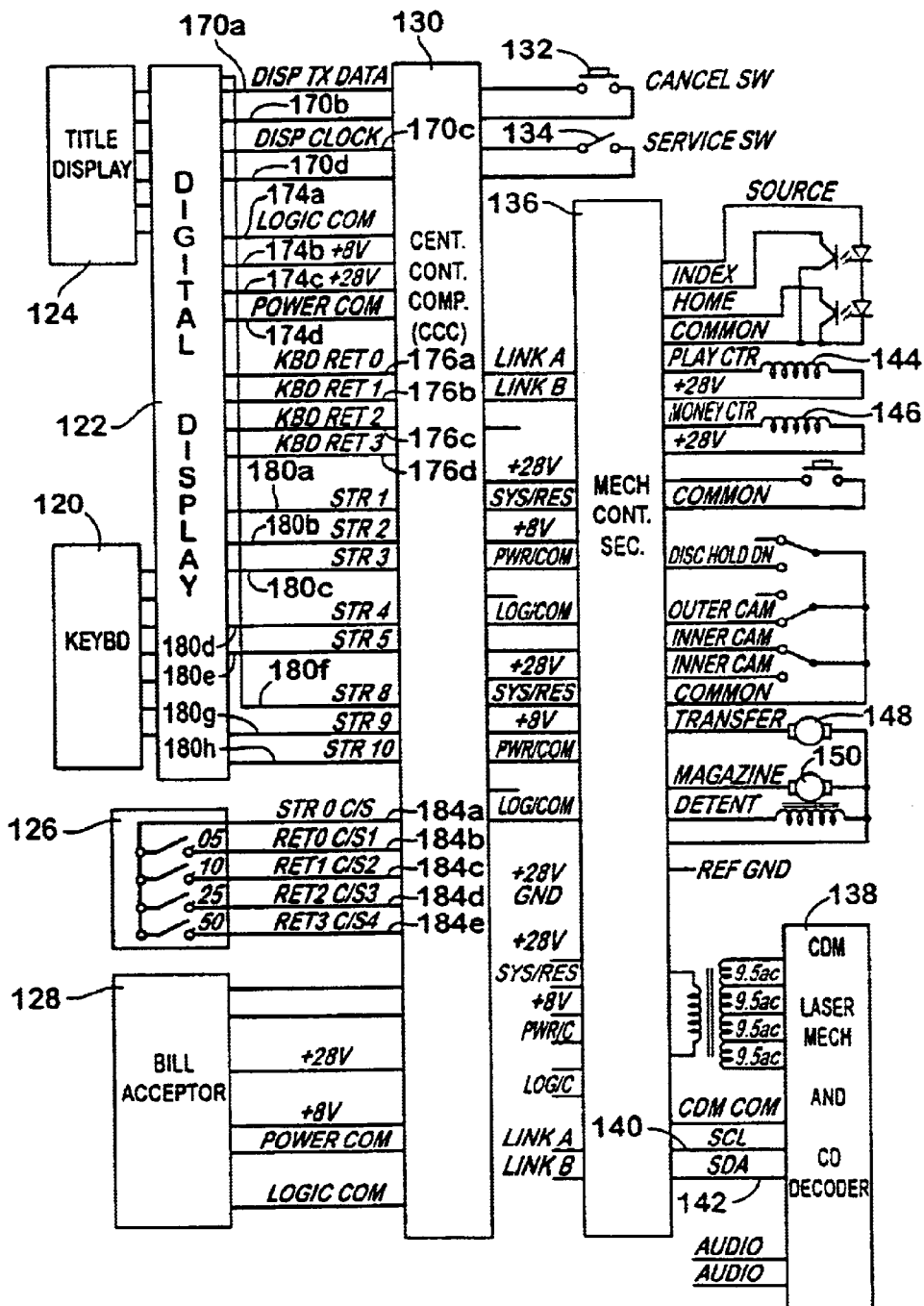
FIG. 3 is a block diagram of our control system for a CD automatic phonograph.

Referring now to FIG. 3, which is a block diagram of the control system for our title display, the control system includes a keyboard indicated by the block 120, adapted to input information to a digital display system 122. This digital display unit 122 feeds information to and receives information from the title page display unit 124.

A coin mechanism 126, which may for example be responsive to nickels, dimes, quarters and half-dollars, provides monetary input information to the central control computer 130 of the control system.

A bill acceptor 128 which may, for example, accept $1 and $5 bills, provides corresponding credit information to the central control computer 130. As is known in the the central control computer 130 accumulates credit information from the coin mechanism 126 and the bill acceptor 128 from which credit is subtracted as selections are played.

The digital display unit 122 provides certain input information to the control computer and receives information therefrom from which it provides various displays, such for example as the selection being played and other information, as will be described more fully hereinbelow.

The central control computer 130 has associated therewith a cancel switch 132, which may be actuated to cancel a selection, as well as an internally accessible service switch 134 which may be closed to place the unit in a service mode for reasons which will be described more fully hereinbelow.

The central control computer 130 provides the necessary inputs to the mechanism control section 136 of the control system to cause the jukebox to operate in the intended manner. The mechanism control section communicates with the compact disc player 138 including the laser mechanism and CD decoder over lines 140 and 142.

In addition to communicating with the unit 138, the mechanism control section provides the required signals for other various units of the machine, such for example as the play counter 144, the money counter 146, the transfer motor 148 and the magazine motor 150.

Figure 4:
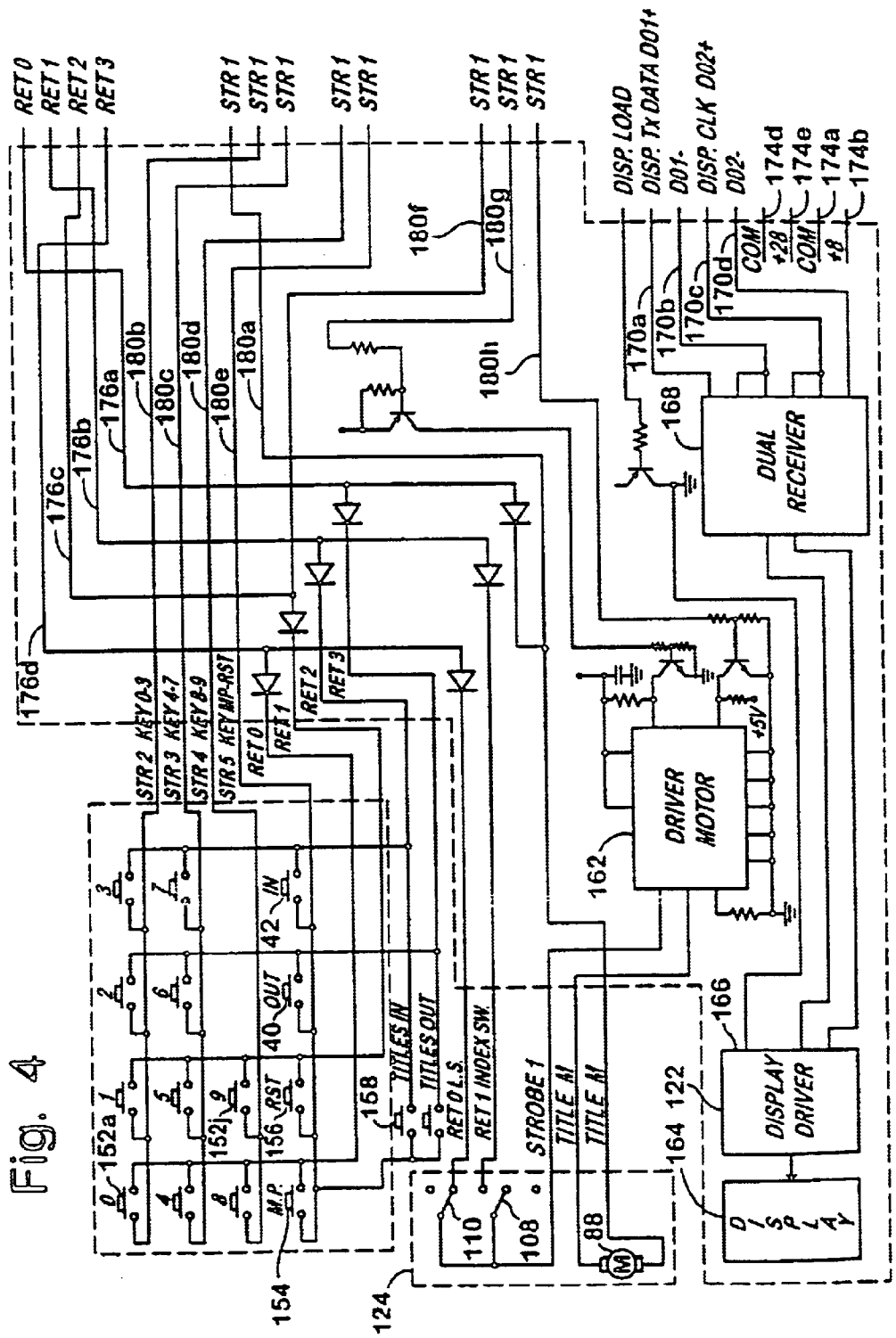
FIG. 4 is a schematic view of the title display, digital display and keyboard position of the control system of FIG. 1.

Referring now to FIG. 4, the keyboard assembly 120 which is indicated generally by the reference character 44 in FIG. 1, includes a pushbutton switch 40 adapted to be operated to cause the tile pages to flip outwardly and a pushbutton switch 42 adapted to be operated to cause the pages to flip inwardly. In addition, the keyboard 120 includes numeric pushbuttons 152*a* through 152*j* which are operated to make selections in the normal operational mode of the machine and which are operated in predetermined sequences in the service mode of the machine. A "most popular" selection switch 154 and a reset switch 156 complete the switches of the keyboard 120. In the service mode, a pair of switches 158 and 160 internal to the jukebox may be operated to cause the titles to move inwardly or outwardly.

The title display unit 124 includes the drive motor 88, the indexing switch 108, and the limit switch 110.

Associated with the title display page unit 124 and indicated as a part of the digital display unit 122, is a motor driver 162 which may for example be a Sprague Electric UDN 2953B. As will be explained more fully hereinbelow, in operation of the system the control circuitry knows the present location and direction of drive of the display system so that proper control is achieved.

The visual display unit 164 may for example be a vacuum fluorescent display of any type known to the art which is adapted to provide the extent of display required. Associated with the unit 164, is a display driver 166 which may be a Rockwell International 10937P. A dual receiver 168 which may be a National Semiconductor DS88C20 couples the display data to the driver 166 which, in a manner known to the art, actuates the display unit to provide the visible display. We have indicated the nature of the couplings between the digital display section 122 and the central computer 130 to the right in FIG. 4.

Figure 6:
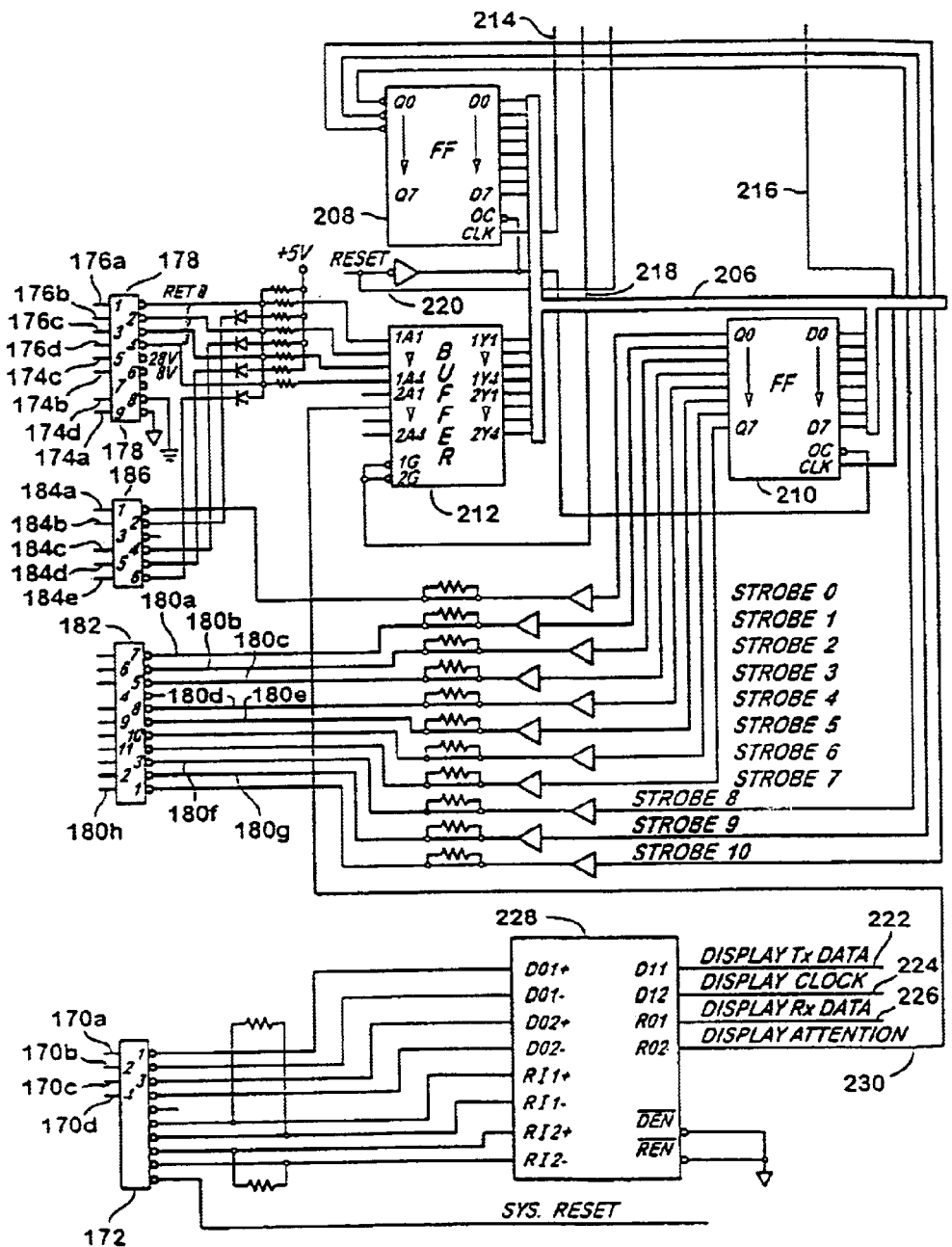
FIG. 6 is a schematic view of the remainder of the central control computer of our automatic phonograph control system.

Referring now to FIGS. 4 and 6, we have indicated the connection between the digital display section 122 and the central control computer 130 in the following manner. The channels indicated by the reference characters 170*a* and 170*b* and 170*c* and 170*d* correspond to the DISPLAY TX DATA and DISPLAY CLOCK and lead to a terminal element 172 of FIG. 6. A first group of conductors corresponding respectively to the logic common, the +8 volt DC line, the +28 volt DC line and the power common, as well as a group of conductors 176*a* to 176*d*, corresponding to the keyboard returns 0 through 3, are coupled to a terminal element 178 of FIG. 6 in the order shown. Conductor 180*a* through 180*h* which carry respective strobes 1 to 5 and 8 to 10 lead to a terminal element 182 of FIG. 6. Conductors 184*a* through 184*e* which correspond to the 0 strobe for the coin switch, as well as the coin switch returns 0 to 3 are connected to a terminal element 186 of FIG. 6.

Figure 5:
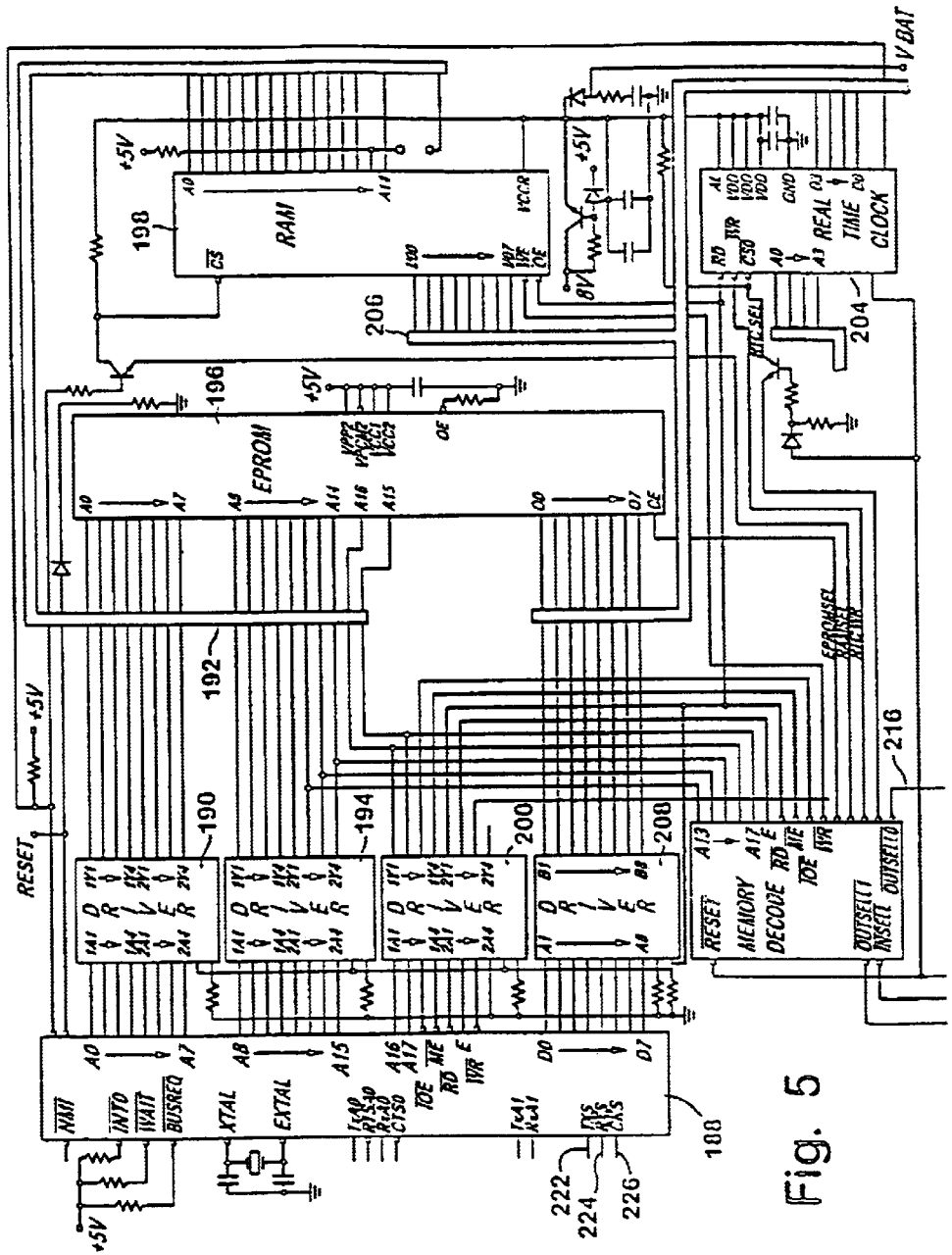
FIG. 5 is a schematic view of a portion of the central control computer of our control system.

Referring now to FIGS. 5 and 6, the central control computer 130 includes a microprocessor 188 which may for example be a Hitachi 64180. The address output ports A0 through A7 of the microprocessor 188 are coupled to a driver 190 leading to an address bus 192 of the system. Similarly, the output ports A8 through A15 of the microprocessor 188 provide inputs to a second driver 194 which also supplies the address bus 192. Drivers 190 and 194 may, for example, be 74HCT244 drivers. The address bus 192 provides input data for an EPROM 196 such as a 27512 and a RAM 198 such as 6264. A third driver 200 which may also be a 74HCT244 provides two more address bits as well as command signals to a memory decoding matrix 202 which may be, for example, a 72421.

As is known in the art, in response to actuation the EPROM and the RAM are adapted to put out data on a data bus 206. Another driver 208 which may be a 74HCT245 couples the data bus 206 to the D0 to D7 terminals of the microprocessor 188. Data bus 206 is coupled to the D0 to D7 inputs of each of a pair of flip-flops 208 and 210 shown in FIG. 6, which flip-flops may, for example, be 74LS374 flip-flops. We also couple the data bus 206 to the terminals 1Y1 to 1Y4 and 2Y1 to 2Y4 of a buffer 212 which may be a 74HC244. A conductor 214 connects the OUT SEL 1 to the clock input terminal of the flip-flop 208 which provides output strobes 8 to 10 leading to the terminal 182.

Another conductor 216 connects the OUT SEL 0 of the decoder 202 to the clock input terminal of the flip-flop 210 which provides strobes 0 through 7 associated with the terminal 182.

A conductor 218 connects the IN SEL terminal of the decoder 202 to the buffer 212 which is associated with terminals 178 and 186.

Respective conductors 222, 224 and 226 connect the TXS RXS and CKS ports of the microprocessor 188 to the D11, D12 and R01 inputs of the circuit component 228 which may, for example, be a DS8923 associated with the terminal 172 to control the title page display. A conductor 230 connects the 202 terminal of the component 212 to the R02 input of the component 228 to cause the display to operate in the "Attention" mode.

Compact disc player 138 which is incorporated in our phonograph may be of any suitable type known to the art. For example, it may be a Phillips CDM3 laser mechanism and decoder board. It incorporates the laser mechanism for reading the disc and a decoder and servoprocessor which communicates with the mechanism control 136 over a two wire serial bus identified by the reference characters 140 and 142. This bus carries the CDM START and CDM STOP signals as well as the CD DATA.

Figure 7:
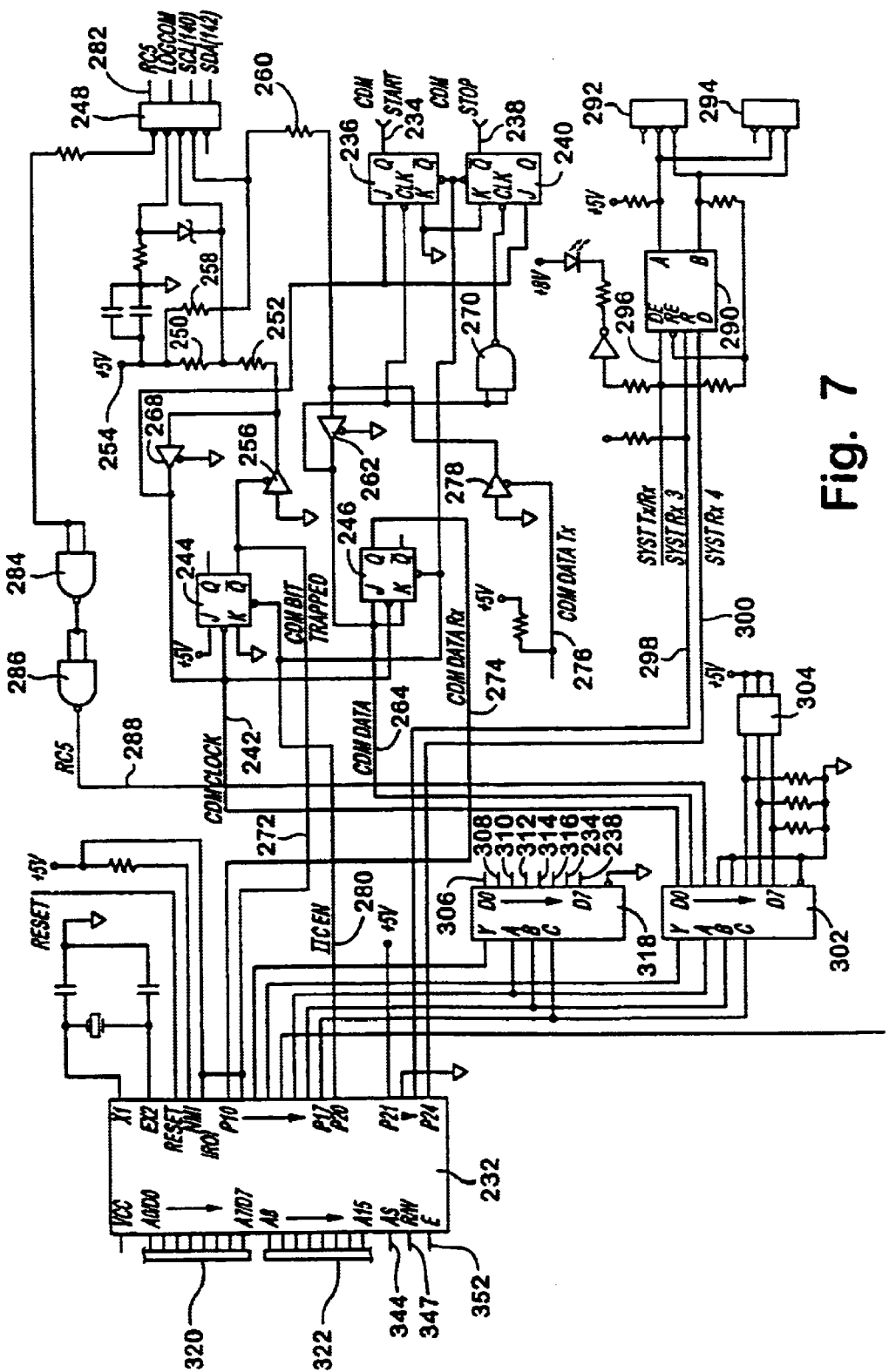
FIG. 7 is a schematic view of a portion of the mechanism control section of our control system.
Figure 8:
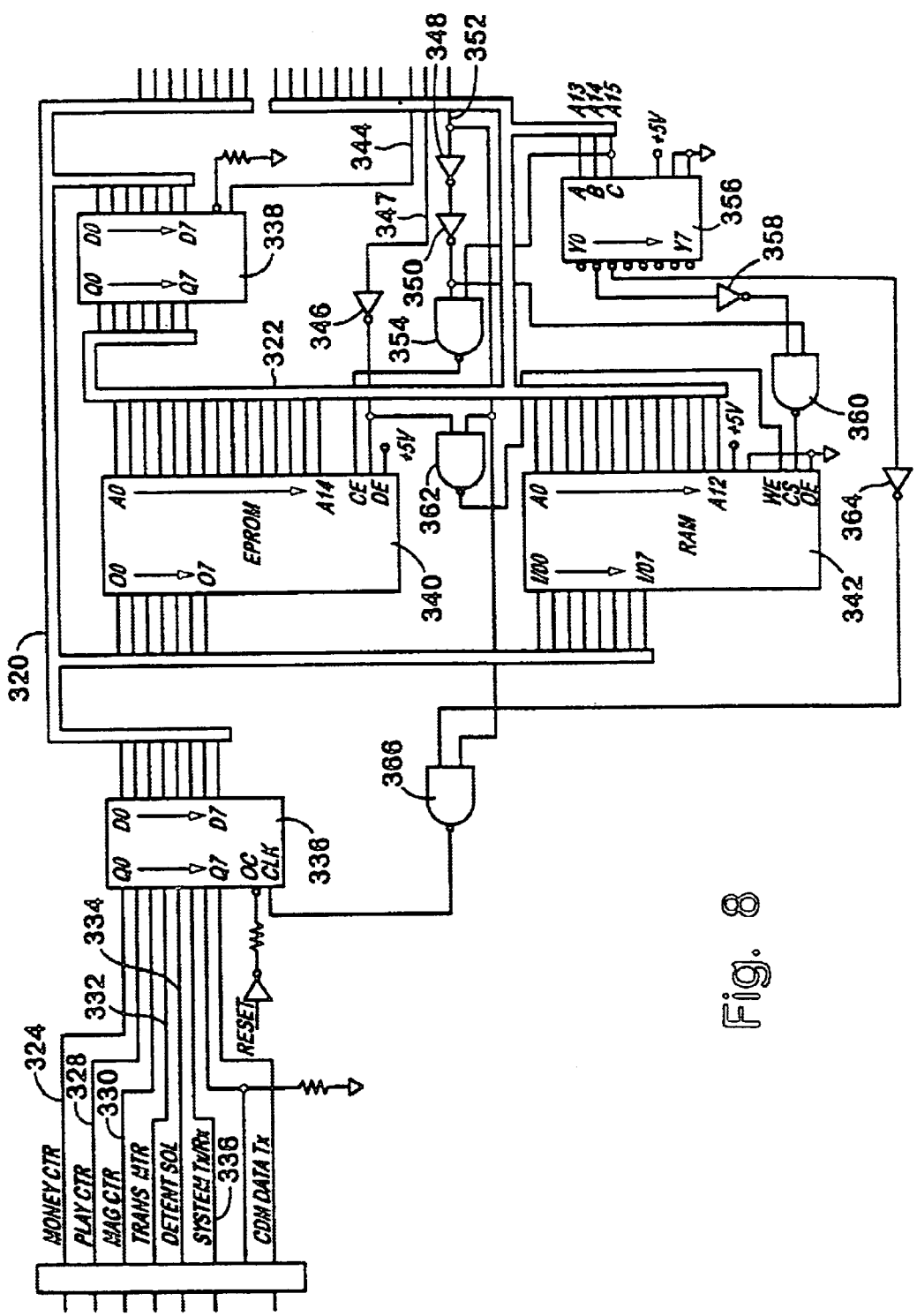
FIG. 8 is a schematic view of the remainder of the mechanism control section of our control system.

Referring now to FIGS. 7 and 8, the mechanism control assembly, including the servoprocessor communication and system communication portions has a microprocessor 232. As is known in the art, the unit 138 puts out a CDM START signal which is fed to a line 234. We apply this signal to the Q input terminal of a dual J-K flip-flop 236. Similarly, the unit 138 puts out a CDM STOP signal which is fed a line 238 which we apply to the Q terminal of a second JK flip-flop 240. We apply the clock signal on line 242 to the CLK terminals of a second pair of JK flip-flops 244 and 246. Terminal 248 couples the SCL line 140 to the common terminal of a pair of voltage dividing resistors 250 and 252 connected between a terminal 254 of +5 volts DC and the output of a buffer 256, the input of which is connected to logic ground and the control terminal of which is connected to the Q input of flip-flop 244. Flip-flops 236, 240, 244 and 246 may be of any suitable type such as 74HCT73.

Terminal 248 also connects the SDA line 142 to a common terminal of a pair of voltage dividing resistors 258 and 260 connected between terminal 254 and the input of a buffer 262, the output of which is connected to the common JK terminals of flip-flop 246 and to a CDM DATA line 264. We connect the control input terminal of buffer 262 to logic ground. Buffer 268, the control terminal of which is connected to logic ground, couples the output of buffer 250 to the clock line 242. A two-input NAND circuit 270, the inputs of which are tied together, connects the output of buffer 266 to the CLK terminal of flip-flop 240.

A CDM BIT TRAPPED line 272 connects the Q output of flip-flop 244 to the port P11 of microprocessor 232. A CDM DATA RX line 274 connects the Q output of flip-flop 246 to port P10 of the microprocessor 152. We connect a CDM DATA TX line 276 to the inhibit input terminal of a buffer 278, the input of which is connected to logic ground and the output of which is connected to the input of buffer 262.

IIC EN line 280 connects port P20 of the microprocessor 232 to CL input terminals of flip-flops 236, 240, 244 and 246.

Terminal 248 connects an RC5 line 2A2 to the common input terminals of a two input NAND circuit 284, the output of which is connected to the common input terminals of second two input NAND circuit 286 to provide the RC5 signal on line 288. 288.

A transceiver 290 which may be a 75176, for example, couples terminals 292 and 294 to line 296 carrying a SYSTEM Tx/Rx signal, line 298 providing a SYSTEM Rx signal and line 300 carrying a SYSTEM Tx signal.

Lines 242, 264 and 288 provide the D0 to D 2 input to an eight input DATA SEL component 302. A route electing DIP switch array 304 provides the D5 to D7 inputs to component 302. The Y output and A, B, C inputs of component 302 are connected respectively to ports P13, P15, P16 and P17 of the microprocessor 232.

Apparatus for handling the discs and for moving them from the supply magazine to the disc player will not be described in detail since this apparatus per se forms no part of our invention. This mechanism, however, does put out disc hold down signal on line 306, a cancel signal on line 308, an outer cam signal 310, an inner cam signal on line 312, an index signal on line 314 and a home signal on line 316. The signals just described provide the D0 to D5 inputs to another eight input DATA SEL circuit 318, and the Y outputs A, B, C, inputs of which respectively are connected to ports P12, P15, P16 and P17 of the microprocessor 232.

Ports A0/D0 to A7/D7 of the microprocessor 232 supply a data bus 320. Ports AB through A15 supply an address bus 322.

In addition to the signals described hereinabove, the operating parts of the jukebox and its auxiliary equipment provide a money counter signal on line 324, a play counter signal on line 328, a magazine motor signal on line 330, a transport motor signal on line 322 and a detent solenoid signal on line 334. These signals provide the Q0 to Q7 inputs to an octal edge triggered flip-flop 336 which may, for example, be a 74LS374. Ports D0 through D7 of the component 336 are coupled to the data bus 320.

An octal D-type buffer 338 has its ports D0 to D7 connected to the data bus 320. Ports Q0 through Q7 of component 338 provide address bits A0 to A7 on the address bus 322. It will be remembered that bits A8 through A15 for the address bus 322 come from the microprocessor 232.

An EPROM 340 responsive to address bits A0 to A14 provides outputs O0 to O7 on the data bus 320.

A RAM 342 responsive to address bits A0 to A12 has input output ports I/O0 to I/O7 connected to the data bus 320.

A line 344 connects the AS port of the microprocessor 152 to the G port of the buffer 338. Inverter 346 couples the R/W 347 line of microprocessor 232 to the DE port of the EPROM 340. A pair of series connected inverters 348 and 350 connect the E port line 352 of microprocessor 232 to one input terminal of a two-input NAND circuit 354, the other input of which is address bit A15. The output of component 354 is connected to a CE input of EPROM 340. A 3-to-8 line decoder 356 which may be a 74HCT138 is responsive to address bits A13 to A15 to provide outputs Y0 to Y7. An inverter 358 couples output line Y1 of decoder 356 to one input terminal of the two-input NAND circuit 360, the other input of which is supplied by inverter 350. We connect the output of component 360 to the CS port of the RAM 342. A NAND circuit 362, one input of which is provided by inverter 346 and the other input to which is provided by line 352, has an output which is coupled to the WE input port of RAM 342. Inverter 364 couples the Y2 terminal of component 356 to one input of a two input NAND circuit 366, the other input to which is provided by line 352. Circuit 366 provides the clock CLK input to component 336.

As is known in the art, in making a compact disc in the recording studio an original analog sound input wave form is sampled at regular intervals. The measured values are then converted into a series of binary numbers in a quantization step by means of an analog to digital converter. These numbers are encoded into a pulse train, multiplexed and the Cross-Interleaved Reed-Solomon code is added. Then the compact disc subcode is inserted to make it easy to find and to program information. The subcode tells how many tracks are on the disc, as well as the start time, the ending time and the elapsed time of each track. The elapsed time indicates what point on the disc is "currently being read."

Real time clock 204 of the central control computer 130 provides information indicting the day of the week as well as the time of day in the manner of a 24 hour clock. That is to say, an output indicating 0200 is 2 a.m. while an indication of 1400 is 2 p.m. In our arrangement we begin to count using the timer interrupt in device 232 in response to the selection start time indication from the decoder of the unit 138. This interrupt elapsed time is a real or actual elapsed time which is compared with an elapsed time indication from unit 138. If they differ by more than plus or minus one second an indication is given that the disk has "skipped." Explained more frilly, the CD is not read in real time. The laser picks up the musical information in digital form together with subcode information. This digital information is stored and then converted to analog for playing. In determining skips, the mechanism control assembly asks the Philips decoder where it is in the course of playing a selection. If it says we are at 8 and, on the basis of the interrupt elapsed time determined from the unit 232, it should be at 5, a skip is indicated. Similarly, if at a later time it says it is at 9, whereas it should be at 11, that is recorded as a second skip.

The general mode of communication between a keyboard processor such as that employed in our automatic phonograph and the servoprocessor forming part of the unit 138 is known in the art, it will not be described in detail. In general, communication is by means of set of high level commands which the servoprocessor translates into procedures and signals for the servo system and decoder and reports its state to the keyboard processor. The servoprocessor stores the subcode data from the decoder and when not busy controlling the pickup, the processor transmits the subcode to the keyboard processor.

Figure 9:
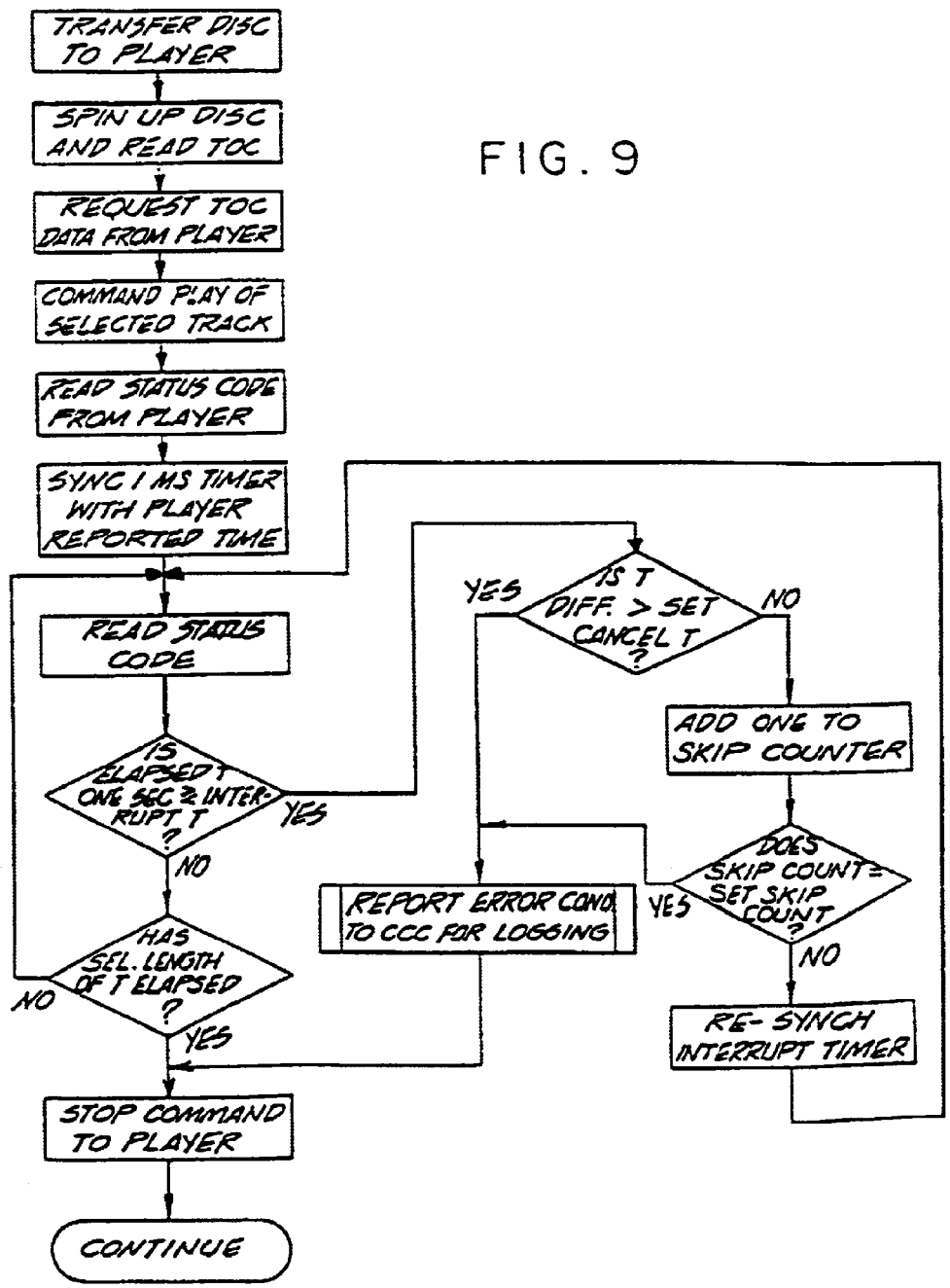
FIG. 9 is a flow diagram illustrating the operation of our system in determining skips or defects in the discs.

Referring now to FIG. 9, we have shown a flow chart illustrating the operation of our control system in detecting skips and in using and displaying the resultant information. When a selection is made to the disc carrying the selection in one of its tracks, first it is transferred to the player from the storage magazine. The disc is spun up, the table of contents is read by the decoder. The mechanism control assembly requests this table of content (TOC) data from the player. Next it issues a command to the player to play the selected track. The status code of the player is read and the one millisecond timer is synchronized with the player reported time. When the synchronization has been achieved, the status code is continually read from the player. A determination is made of whether or not the elapsed time recorded by the player differs from the interrupt elapsed time by more than one second. If the answer to this question is no, the system continues to make a comparison of the reported elapsed time with the interrupt elapsed time until the selection is over. When the selection is over, a stop command is issued to the player and the system continues in its normal mode of operation.

If the answer to the question of whether or not the reported elapsed time is different from the interrupt elapsed time by more than one second is yes, a determination next is made as to whether or not the skip time is equal to or greater than the set cancel time. If the answer to this question is yes, the error condition is reported to central control computer for logging and a stop command is issued to the player so that the selection is automatically cancelled and the system returns to its normal operation.

If, following a determination that the reported elapsed time differs from the interrupt elapsed time by more than one second, a determination is made that the skip time is less than the set cancelled time. "1" is added to the skip counter and a determination is made of whether or not the skip count is equal to the set skip count. If it is, this condition is reported to the central control computer and a stop command is issued to the player to cancel this selection. If the skip count is not yet equal to the set skip count, the interrupt timer is resynchronized and the system returns to the question of whether or not an elapsed time reported by the player is different from the interrupt elapsed time by more than one second.

As is pointed out hereinabove, we provide our system with means for permitting the operator of the phonograph to view disc conditions which have theretofore been determined and logged. In order to do so, the operator closes the service switch 134 and the display 46 shows SERVICE MODE. When that has been done the digits 8 and 6 are typed in by actuating pushbuttons 152i and 152g. The display 46 then shows DISC CONDITIONS. Popular button 154 is actuated. If there have been no conditions reported, a display 46 indicates this fact by showing NO CONDITIONS.

If in fact there have been some conditions which have been logged, when the popular button 154 is operated a display will show SEL followed by a first two digit number which will be the disc number followed by a second two digit number which will be the track number. Also displayed will be the legend OCC followed by a two digit number indicating the number of occurrences. The operator then holds the reset button 156 while pushing the button 152j corresponding to the digit 9. When that has been done, the display carries the legend CANCEL followed by a two digit number indicating the number of seconds and the legend SKIP followed by a two digit number indicating the number of skips. Again pushing the reset button 156 and holding it, button 152j corresponding to the digit 9 is again pushed upon which the display 36 shows TIME followed by two two-digit numbers separated by a colon indicating the time of the last occurrence and a second display of two two-digit numbers separated by a slash indicating the date of the last occurrence by month and day.

Holding the reset button 156 and pressing button 152d corresponding to the digit 3, the next disc condition can be viewed. Holding the reset button 156 and pushing the button 152c corresponding to the digit 2, the previous disc condition can be viewed. These steps are carried out as often as necessary to view the conditions of all the discs in the phonograph. Having viewed the conditions, the operator can of course clean or replace the discs as necessary.

In connection with the disc number and track number display noted hereinabove, selections ending in 00 do not actually exist. If the display selection number ends in 00 it means that the CD layer could not correctly read the disc's table of contents. In such a case, it may be that the disc is installed backwards, is dirty, is a bad disc, is not initialized, or is absent.

In the display immediately following the display of the disc and selection number, the number after the legend CANCL represents the total amount of time in which the selection was off when it was cancelled. For example, if 12 is reported the selections skip ahead or back by twelve seconds. The maximum skip time before cancellation can be set in the manner described hereinbelow.

The second number reported after the SKIP legend is the number of times the disc skipped by more than one second. The limit of skips permitted may be set in a manner described hereinbelow. It would readily be appreciated that if a condition is reported because of this parameter, the number will always be the same as the programmed limit.

The total permissible skip time before cancellation, as well as the total number of skips which are permitted before cancellation can be set during the initialization portion of the program. First, switch 134 is closed to place the apparatus in the service condition. Next, the buttons 152d and 152g corresponding to the digits 3 and 6 are pressed. When that has been done, the new number is typed and popular button 154 is actuated.

In setting the cancel time with the control system in the service mode, buttons 152d and 152h are pressed. Next, the new number is typed in and the popular button 154 is pressed.

The disc conditions which have been logged in the memory will remain therein until they are cleared in the following manner. With the control system in the service mode with the machine set so that it is in the service mode and the display shows SERVICE MODE, button 152i corresponding to the digit 8 is pushed and the display will indicate STATUS. Pushing button 152h corresponding to 7 will result in the display of CLEAR CONDITIONS. Next, the popular button 154 is pushed and the display of CLEAR CONDITIONS will blink and then reappear. In this way all of the disc conditions will have been removed from memory.

As has been pointed out hereinabove, our system incorporates a number of other significant features in addition to that of detecting, recording and displaying disc conditions. One of these features is the option for clearing selections which remain to be played after a period of time during which the phonograph is off. The significance of this feature will readily be appreciated from the fact that at the time of closing of the establishment in which the phonograph is located, there may remain to be played a number of selections. The proprietor may well wish to have such selections cleared automatically after a period of time during which the phonograph is off. For example, a time of four hours may be selected. In our control system this option may be toggled on and off by holding the reset button 156 and actuating button 152j corresponding to the digit 9. When the automatic clear option has been set to either the on or off condition, the change can be preserved by pushing the popular button 154. It will readily be appreciated that these operations take place when the system is in the SERVICE mode.

We also provide means for changing the time of the clear option to a different amount of time. This is achieved in the service mode of the system by actuating buttons 152g, 152j and 152b in sequence, typing in a new time and then operating the popular button 154.

The timed free play feature allows the operator to program specific days and times of day as free play time. This is achieved by comparing times set in the memory with the time indicated by the real time clock 204. With the control system in the SERVICE mode, the timed free play may be turned on or off by actuating buttons 152f and 152e corresponding to the digits 5 and 4 sequentially. With the reset button 156 held, the button 152j can be pushed to turn the timed free play schedule on or off. After the schedule has been set on or off the popular button 154 is pressed to preserve the change.

By pushing button 152f twice, holding the reset button 156 and pushing button 152j, the free play can be turned off immediately without waiting for the start or stop time. Pushing popular button 154 saves the change.

In order to set the free play scheduled start time of day buttons, 152f and 152g corresponding to digits 5 and 6 are pressed in sequence. Next, the time of day is entered in 24 hour playout. To set the stop time, buttons 152s 152h are pressed in sequence and again the time is entered in 24 hour format.

The days of the week on which the free play feature will turn on can be set by operating buttons 152f and 152i sequentially. Then, the reset button 156 is held and either button 152c or 152d is pushed to move from day to day. The display will show SMTWTFS and the representation of the day currently selected will blink. Under these conditions, by holding the reset button 156 and pushing button 152j, the day selected is turned on or off. Popular button 154 is pushed to preserve any selections which have been made.

Specifically, if the operator of the machine wishes to have free play on from 5 p.m. to 6 p.m. on Mondays, Wednesdays and Fridays, the following sequence of operations is performed. The timed free play is set to on. The free play status is set to off. Start time is set at 17:00 and stop time set to 18:00 and the on days are set to MWF. As has been pointed out hereinabove, the free play status will turn on when the start time matches the hour output of the real time clock 204 and the day of the week matches the clock day. The free play status will be turned off when the set stop time matches the output of the real time clock 204.

In addition to the features described hereinabove, our control system permits AUTOPLAY to be set automatically for four different days and for the times of day, as well as the selections in time between selections. In order to set the various AUTOPLAY parameters, button 152e corresponding to the digit 4 first is pressed. If the button 152a corresponding to "0" next is actuated, the AUTOPLAY can be set either on or off by holding the reset button 156 and pushing button 152j to toggle between the two options. Pushing the popular button 154 sets the option.

In order to set the delay time between AUTOPLAY selections, buttons 152e and 152b are pushed in sequence. The number of minutes desired between autoplays is then typed in and the popular button 154 is actuated.

The time of day that autoplay is allowed to begin is set by sequentially pushing buttons 152e and 152c. Next, the hour in the 24 hour format is entered. This is achieved by typing the hour and actuating the popular button 154 and then setting the minute and pressing the popular button 154 again.

Stop time for the autoplay is set in a manner similar to start time by first actuating buttons 152e and 152d sequentially and then setting in the time in 24 hour format.

To set the days of the week when autoplay can operate, button 152e is pressed twice. When that has been done, the reset button 156 is held and either button 152c or 152d is actuated to move from day to day. The display shows SMTWTFS and the day currently selected blinks. By holding the reset button 156 and pushing button 152j, the day can be turned on or off. Again, the popular button 154 is actuated to save changes.

The individual selections which will be played in the course of an autoplay operation, can be set by sequentially pushing buttons 152e and 152f. When this has been done, the selections to be played are set.

Sequential operation of buttons 152e and 152g clears all the program selections upon pushing of the popular button 154.

The autoplay status can be changed at once without waiting for the start or stop time of day by sequentially operating buttons 152e and 152h and then holding the reset button 156 and toggling on or off by operating button 152j. The popular button 154 is operated to save the changes.

It will readily be appreciated that the various autoplay conditions described hereinabove all are performed with the system in the SERVICE mode.

Our system also permits of reading out the popularity of the various discs and selections. With the system set in the SERVICE mode, buttons 152b and 152h are pressed and the display shows the most popular disc number followed by the number of plays that disc had. The next most popular may be displayed by holding the reset button 156 and pressing button 152d. In this manner, the display will show the discs in the order from most popular to least popular. By holding the reset button 156 and pushing button 152c the display will move upwardly through the popularity order toward the most popular. The popularity for any particular disc can be obtained by pressing the disc number.

Conversely to the most popular display, our system provides a least popular disc display which is entered by sequentially pushing buttons 152b and 152i to display the least popular disc and the number of plays. By holding reset and pressing 2, each successive least popular disc will be displayed. By holding the reset button 156 and pushing 152d, the display moves up through the popularity display toward the least popular disc. Again, the popularity of a particular disc can be obtained by pushing the disc number.

In addition to displaying the most popular and least popular discs, our system permits of displaying the most popular selection. This is achieved with the system in the SERVICE mode by sequentially pushing the buttons 152b and 152j so that the display shows a total of four digits indicating the selection, followed by the number of plays that selection had. By holding reset button 156 and pushing button 152d, the system displays each successive most popular selection. Conversely, by pushing and holding the reset button 156 and pressing button 152c, the display will move upwardly toward the most popular selection.

It will be seen that we have accomplished the objects of our invention. We have provided an automatic phonograph control system which is more sophisticated than are control systems of the prior art. Our system is especially adapted for use with a CD player. Our system automatically cancels a selection after a predetermined number of skips. It likewise cancels a selection after a predetermined maximum skip time has elapsed. Our arrangement records all skips and cancellations for later review on the phonograph display. Our control arrangement includes an autoplay feature which can be set for days of the week, hours of the day, intervals between autoplays and selected or random autoplays. We have provided a free play feature which can be set for days of the week and times of the day. Our control automatically clears unplayed selections after a period of time during which the phonograph is off.

It will be understood that certain features and subcombinations are of utility and may be employed without reference to other features and subcombinations. This is contemplated by and within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. An automatic disc phonograph comprising:
   a storage unit for storing a plurality of compact discs having music selections stored thereon;
   a player for playing said compact discs;
   a keyboard for selecting a disc to be played by said player;
   a memory adapted to record the number of times a selected disc could not be read by said player and the identity of the disc; and
   a controller adapted to read said memory.

2. The phonograph of claim 1 further comprising a money acceptor adapted to allow the compact disc to be played only after the receipt of a predetermined amount of money.

3. The phonograph of claim 2 further comprising a display that visually indicates which compact discs may be played.

4. A method of operating an automatic compact disc phonograph comprising:
   storing a plurality of compact discs having music selections stored thereon;
   providing a player for playing said discs;
   providing a keyboard for selecting a disc to be played by said player;
   recording the number of times a selected disc could not be read by the player together with the identity of the disc; and
   reading the recorded number.

5. The method of claim 4 further comprising providing a money acceptor adapted to allow the compact disc to be played only after the receipt of a predetermined amount of money.

6. The method of claim 5 further comprising providing a display that visually indicates which compact discs may be played.

* * * * *